(12) United States Patent
McGregor Olney (10) Patent No.: US 10,108,604 B2
(45) Date of Patent: Oct. 23, 2018

(54) SYSTEM AND METHOD FOR AUTOMATIC EXTRACTION OF CONCEPTUAL GRAPHS

(76) Inventor: Andrew McGregor Olney, Memphis, TN (US)

( * ) Notice: Subject to any disclaimer, the term of this patent is extended or adjusted under 35 U.S.C. 154(b) by 0 days.

(21) Appl. No.: 12/950,560

(22) Filed: Nov. 19, 2010

(65) Prior Publication Data

US 2012/0131073 A1 May 24, 2012

(51) Int. Cl.
*G06F 17/30* (2006.01)
*G06F 17/27* (2006.01)

(52) U.S. Cl.
CPC .... *G06F 17/2785* (2013.01); *G06F 17/30684* (2013.01); *G06F 17/30734* (2013.01)

(58) Field of Classification Search
USPC .............. 707/603, 999.001, 999.003; 706/45
See application file for complete search history.

(56) References Cited

U.S. PATENT DOCUMENTS

| | | | |
|---|---|---|---|
| 6,263,335 B1* | 7/2001 | Paik et al. | |
| 6,292,792 B1* | 9/2001 | Baffes | G06N 5/022 706/45 |
| 7,392,238 B1* | 6/2008 | Zhou et al. | |
| 8,112,384 B2* | 2/2012 | Mitra et al. | 707/603 |
| 2002/0111941 A1* | 8/2002 | Roux et al. | 707/3 |
| 2003/0020749 A1* | 1/2003 | Abu-Hakima et al. | 345/752 |
| 2004/0093328 A1* | 5/2004 | Damle | 707/3 |
| 2007/0156677 A1* | 7/2007 | Szabo | 707/5 |
| 2007/0203693 A1* | 8/2007 | Estes | 704/9 |
| 2008/0189268 A1* | 8/2008 | Au | 707/5 |
| 2009/0070322 A1* | 3/2009 | Salvetti et al. | 707/5 |
| 2009/0089277 A1* | 4/2009 | Cheslow | 707/5 |
| 2009/0259459 A1* | 10/2009 | Ceusters | G06F 17/2775 704/9 |
| 2010/0046037 A1* | 2/2010 | Noel et al. | 358/402 |
| 2010/0228693 A1* | 9/2010 | Dawson et al. | 706/12 |
| 2010/0287179 A1* | 11/2010 | Peoples et al. | 707/769 |
| 2011/0161073 A1* | 6/2011 | Lesher et al. | 704/10 |

OTHER PUBLICATIONS

"On Developing Case-Based Tutorial Systems with Conceptual Graphs", Fung et al., 1999, Lecture Notes in Computer Science.*

* cited by examiner

*Primary Examiner* — Dung K Chau
(74) *Attorney, Agent, or Firm* — Wayne Edward Ramage; Baker Donelson (57) ABSTRACT

A system for processing text files to extract and create conceptual graphs. The system determines key terms, prescribes a set of edge relations (i.e., defines edge categories), and the extracts conceptual graphs from source documents, including raw text, using these representations together with a semantic parser, followed by post processing. The conceptual graphs can then be used for a variety of purposes, including the creation of questions in an automated tutor system.

19 Claims, 7 Drawing Sheets

FIGURE 1

|  | Index | Glossary | Keywords |
|---|---|---|---|
| Total terms | 3075 | 867 | 279 |
| Unique terms | 2539 | 336 | 90 |

FIGURE 2

| | | | | | |
|---|---|---|---|---|---|
| after | contrast | enable | has-consequence | lack | produce |
| before | convert | example | has-part | location | purpose |
| combine | definition | extent | has-property | manner | reciprocal |
| connect | direction | follow | implies | not | require |
| contain | during | function | isa | possibility | same-as |

FIGURE 3

| Id | Form | Lemma | POS | Head | Dependency Relation | Predicate | Arg 1 | Arg 2 |
|----|------|-------|-----|------|---------------------|-----------|-------|-------|
| 1 | abdomen | abdomen | NN | 2 | SBJ | _ | _ | _ |
| 2 | is | be | VBZ | 0 | ROOT | _ | _ | _ |
| 3 | a | _ | DT | 5 | NMOD | _ | _ | _ |
| 4 | posterior | posterior | JJ | 5 | NMOD | _ | _ | _ |
| 5 | part | part | NN | 2 | PRD | part.01 | _ | _ |
| 6 | of | _ | IN | 5 | NMOD | _ | A1 | _ |
| 7 | an | _ | DT | 8 | NMOD | _ | _ | _ |
| 8 | arthropod | arthropod | NN | 10 | NMOD | _ | _ | A1 |
| 9 | s | _ | POS | 8 | SUFFIX | _ | _ | _ |
| 10 | body | body | NN | 6 | PMOD | body.03 | _ | _ |
| 11 | . | _ | . | 2 | P | _ | _ | _ |

FIGURE 4

| Count | Key Term | Count | Relation |
|-------|----------|-------|----------|
| 552 | ANIMALS | 12321 | has-property |
| 457 | CELL | 6441 | has-consequence |
| 440 | SPECIES | 1918 | isa |
| 293 | GENES | 1320 | manner |
| 285 | BLOOD | 1012 | location |

SYSTEM AND METHOD FOR AUTOMATIC EXTRACTION OF CONCEPTUAL GRAPHS

This invention was made with the support of the United States government under IES Contract No. R305A080594. The Government has certain rights in this invention.

FIELD OF INVENTION

This invention relates to a system and method for automatically extracting conceptual graphs as domain models in intelligent tutoring systems.

BACKGROUND OF THE INVENTION

In intelligent tutoring systems (ITS), the representation of subject matter knowledge is referred to as a domain model. A domain model is an integral part of an ITS, and typically is strongly connected with both the model of the student's knowledge (student model) and the model of how to teach the subject matter (pedagogical/expert model).

There are several different formulations of domain models in use today, with representations ranging from logic to statistics. Conceptual graphs, also referred to as concept maps, have been used as declarative ITS domain models in a middle ground between first order logic and statistical representations. In general, a concept map comprises a set of nodes (concepts) and edges (relations) describing a core concept or answering a core question.

One example is CIRCSIM-Tutor, a dialogue-based tutor for causal relationships in the cardiovascular system. The goal of CIRCSIM-Tutor is for the student to learn an underlying causal concept map and use it to solve problems and construct explanations. Causal relations have a +/− valence, indicating a direct or inverse relationship of one concept/variable on another. For example, carrots may be directly causally related (+) to rabbits, such that an increase in the number of carrots leads to an increase in the number of rabbits. At least one version of CIRCSIM-Tutor used an overlay model of a concept map as a student model, and the concept map is also used for understanding student utterances. This multiple functionality demonstrates that concept maps can be flexible representations.

Another ITS that uses concept maps as a domain model is Betty's Brain, which uses the "learning by teaching" paradigm to help student learn about relationships in river ecosystems. Students teach an agent, Betty, whose brain is reified as a causal concept map highly similar to that of CIRCSIM-Tutor, with additional hierarchical (i.e. is-a) and descriptive relations (i.e. has-property). Students use an available hypertext as a source for information, and then "teach" specific nodes and relations in that domain by populating them with content and linking them together. Once created, the concept map can be queried by the student, or even allow Betty to "take" a quiz, using a qualitative reasoning algorithm. The student-created concept map is complemented by a hidden expert-created concept map. This map is used by a mentor agent, Mr. Davis, to provide hints and feedback. Thus, one way to characterize the goal of the system is to bring the student's map into alignment with the expert map. As exemplified by CIRCSIM-Tutor and Betty's Brain, conceptual graphs can be used as both domain models and overlay student models, as well as to interpret student utterances, generate explanations, and perform qualitative reasoning. However, in both CIRCSIM-Tutor and Betty's Brain, expert conceptual graphs need to be authored.

There are different approaches taken towards conceptual graphs based upon different subject matters and fields. In one formulation (now an ISO standard), conceptual graphs are interchangeable with predicate calculus and thus equivalent in power to logical/inferential domain models. Of particular importance is grain size, i.e., the level of granularity given to nodes and relationships. In these conceptual graphs, grain size is very small, such that each argument (e.g., John) is connected to other arguments (e.g., Mary) through an arbitrary predicate (e.g., John loves Mary). Aside from the tight correspondence to logic, grain size turns out to be a relevant differentiator amongst conceptualizations of conceptual graphs amongst different fields.

Another formulation comes from the psychology literature, with some emphasis on modeling question asking and answering. In this formulation of conceptual graphs, nodes themselves can be propositions (e.g., "a girl wants to play with a doll"), and relations are limited as much as possible to a generic set of propositions for a given domain. For example, one such categorization consists of 21 relations including is-a, has-property, has-consequence, reason, implies, outcome, and means. A particular advantage of limiting relations to these categories is that the categories can then be set into correspondence with certain question types (e.g., definitional, causal consequent, procedural) for both answering questions and generating them.

Finally, concept maps are widely used in science education for both enhancing student learning and assessment. Even in this community, there are several formulations of concept maps, including hierarchical maps, cluster maps, MindMaps, computer-generated associative networks, and concept-circle diagrams, among others. One example is the SemNet formulation, which is characterized by a central concept (which has been determined as highly relevant in the domain) linked to other concepts using a relatively prescribed set of relations. End nodes can be arbitrary, and cannot themselves be linked to unless they are another core concept in the domain. Interestingly, in the field of biology, 50% of all links are is-a, part-of, or has property, which suggests that generic relations may be able to account for a large percentage of links in any domain, with only some customization to be performed for specific domains. An example SemNet triple (i.e., start node/relation/end node) is "prophase includes process chromosomes become visible." Several thousand of such triples are available online, illustrating the viability of this representational scheme for biology.

However, the creation and development of a domain model is very challenging and time-consuming, and often requires special authoring tools to accomplish. Accordingly, there is a desire to keep domain models as simple as possible to ease authoring, while keeping them as complex as effectively possible to maximize learning.

SUMMARY OF INVENTION

In various embodiments, the present invention comprises a system for processing text files to extract and create conceptual graphs. In one embodiment, the system determines key terms, prescribes a set of edge relations (i.e., defines edge categories), and the extracts conceptual graphs from source documents, including raw text, using these representations together with a semantic parser, followed by post processing. The source documents should match in some way those used for defining the key terms (e.g., the text associated with a glossary and index). Given the source documents as input, the parser outputs a dependency parse annotated with semantic roles. The conceptual graphs can then be used for a variety of purposes, including the creation of questions in an automated tutor system.

DETAILED DESCRIPTION OF EXEMPLARY EMBODIMENTS

The present system comprises a computer program that processes text files to extract and create conceptual graphs. While the exemplary embodiments described below discuss the creation of conceptual graphs in the field of biology consistent with the SemNet formulation, the system and methodology of the present invention may be used for any subject matter or field, and any formulation of conceptual graphs. Further, the system of the present invention may be used to extract conceptual graphs of differing granularity.

In an exemplary embodiment, a method of the present invention comprises determination of key terms, followed by the prescription of a set of edge relations (i.e., defining edge categories), and in turn followed by the extraction of conceptual graphs from the raw text using these representations together with a semantic parser. Key terms are terms in the domain that are pedagogically significant. Only key terms can be the start of triple, or equivalently, the center of a graph. End nodes can contain key terms, other words, or complete propositions. The other central aspect is labeled edges. A small set of edges account for a large percentage of relationships. In addition, having a prescribed set of edges facilitates linkages between the graph representation and question asking and answering.

For example, consider the extraction of the sentence: "An abdomen is a posterior part of an arthropod's body." The terms "abdomen" and "arthropod" are designated as key terms in the domain, with the following triples:

ABDOMEN is-a part.
ABDOMEN has propertyposterior.
ARTHOPOD has-part ABDOMEN

It should also be noted that ARTHROPOD, being a key term, is also the center of its own graph, so that all key terms are potentially related through a web of interconnections.

Figure 1:
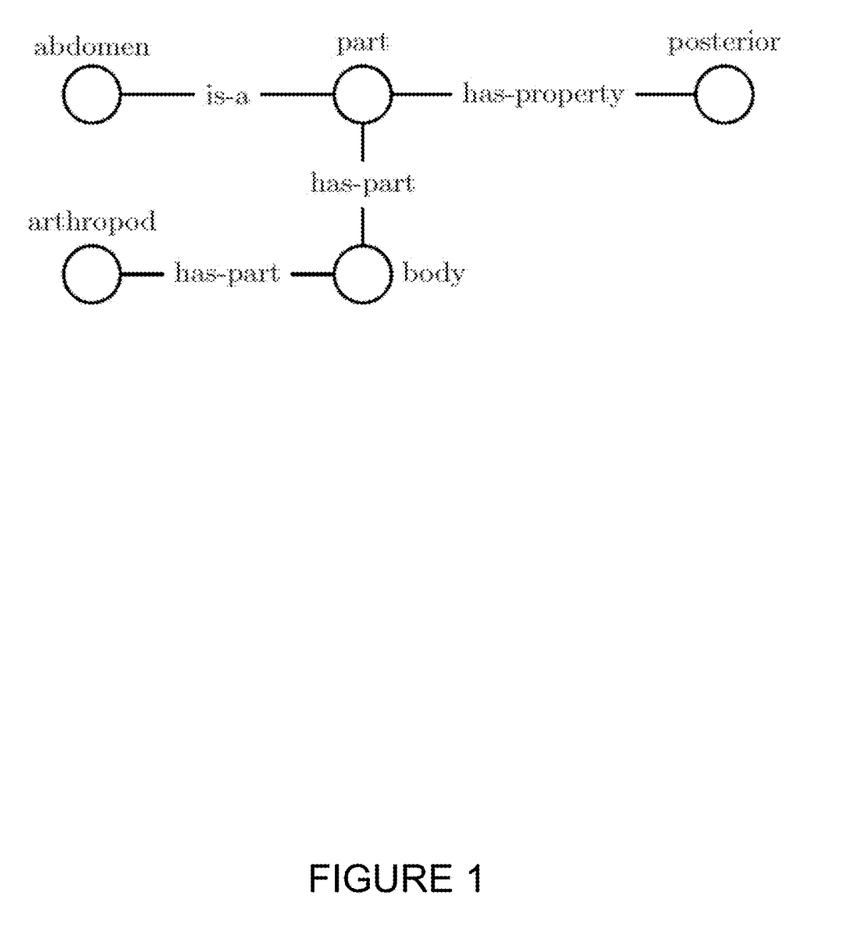
FIG. 1 shows a fine grained concept map in accordance with an exemplary embodiment of the present invention.

Using a finer granularity, the graph shown in FIG. 1 can be extracted. This depiction is much closer to a logical representation. However, the level of granularity is so fine that it captures relations that are irrelevant from a pedagogical standpoint. For example, arthropod has-part body is not very interesting because all living things have bodies. Likewise, body has partpart is not interesting because all bodies consist of parts. Indeed, the most interesting relationships, namely that an abdomen is a posterior part, and that an abdomen is part of an arthropod, span multiple links, making integration of this information more difficult.

Term extraction is an active research area in the art. However, the methods proposed in the art tend to be less relevant in a pedagogical context where key terms are often already provided, whether in glossaries, text-book indices, study guides, or the like. For an ITS, the issue is what source to consult for key terms and whether all terms are given equal status. For example, where the text being extracted is all or part of a textbook in a subject matter area or domain, the key terms can be developed using the glossary and index from the textbook, a test-prep study guide, or the like.

Figure 2:
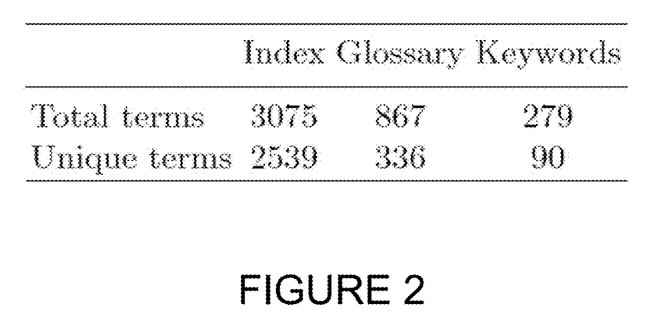
FIG. 2 shows an example of a table with total and unique key terms across sources.

FIG. 2 shows an example of a Keyword Table showing terms across sources. Unique terms are those that appear only in one source and not the others. As shown, there may be many unique terms in each source. The system does not need to take intersections of terms across sources, though intersections might be useful in some embodiments.

Prescribing a set of relations for a domain is difficult because while a large percentage of relations are of a small set, new content can drive new additions to that set. In one embodiment, the present invention determines a set of edge relations by combining domain specific relations from the field of interest (e.g., biology) with psychologically-motivated domain general relations. Furthermore, the semantic parser supports several relations in addition to these included in the description below.

Figure 3:
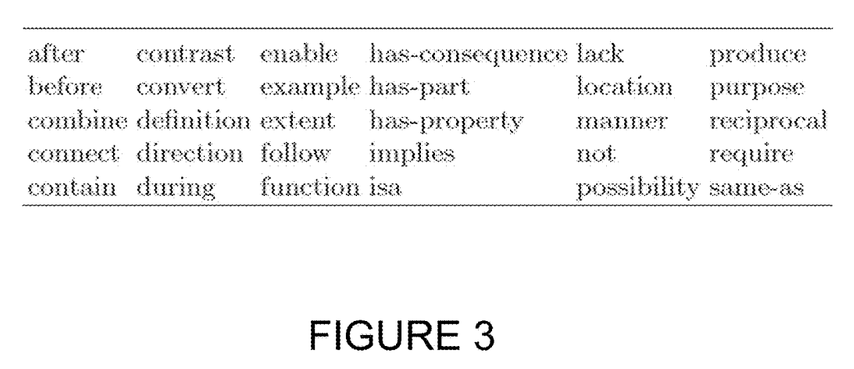
FIG. 3 shows a summary table of domain independent and dependent relations.

In one example where the field of interest is biology, the methodology for specifying a set of domain specific relations is to analyze 4371 biology triples available on the Internet matching the desired subject matter and grade level. These triples span the two topics of molecules-and-cells and population biology. Because these two topics represent the extremes of levels of description in biology, their relations will mostly generalize to the levels between them. A frequency analysis of these triples reveals that, indeed, 50% of all relations are is-a, has-part, or has-property. The 252 relation types are then clustered into 20 relations. For example, the original data set had many subclasses of part relationships, e.g., composed of, has organelle, organelle of, component in, subcellular structure of, and has subcellular structure. Since this subclassing is often recoverable by knowing the node type connected, e.g., an organelle, the mapping of the 252 relation types to 20 relations does not lose a significant amount of information. Domain general relations are derived from the psychology field and the parser's output of adjunct labels. However, neither goal-oriented relationships nor logical relationships (e.g., and/or) were included as these are not appropriate for this particular domain (i.e., a cell divides because it must, not because it \wants to"). General relations that overlap with more specific relations are removed (e.g., temporal is replaced by before, during, after). FIG. 3 shows a summary of all relations used for this example.

With a representational scheme defined for nodes and edges, it is possible to extract conceptual graphs from source documents using a semantic parser and associated post processing. The source documents should match in some way those used for defining the key terms (e.g., the text associated with a glossary and index). Given the source documents as input, the parser outputs a dependency parse annotated with semantic roles.

The parser used may be a parser known in the prior art, such as the LTH SRL Parser, which outputs a dependency parse annotated with semantic roles derived from Propbank and Nombank. For each word token in a parse, the parser returns information about the word token's part of speech, lemma, head, and relation to the head. Moreover, it uses Propbank and Nombank to identify predicates in the parse, either verbal predicates (Propbank) or nominal predicates (Nombank), and their associated arguments.

Figure 4:
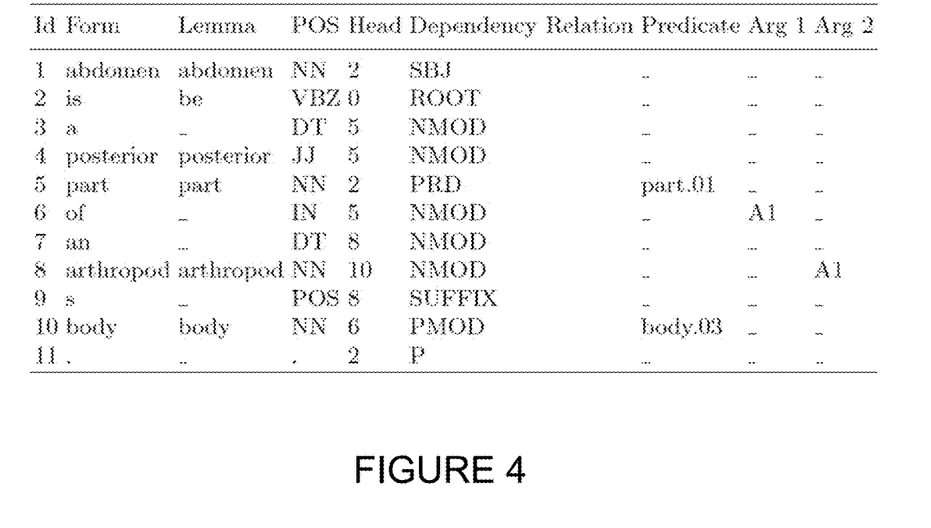
FIG. 4 shows a sample parse output for a sentence.

Because of the work done by the parser, automatic extraction then becomes a task of determining how to derive the relations (such as those shown in FIG. 3) from parse information and how to best identify the units connected by a relation, whether it be a key term or arbitrary text. FIG. 4 displays an example of LTH SRL parse output for a sample sentence, slightly simplified for length considerations. The root of the sentence is "is," whose head is token 0 (the implied root token) and whose dependents are "abdomen" and "part," the subject and predicate, respectively. Predicate "part.01," being a noun, refers to the Nombank predicate "part," roleset 1. This predicate has a single argument of type A1, i.e., theme, which is the phrase dominated by "of," i.e., "of an arthropod's body." Predicate "body.03" refers to Nombank predicate "body," roleset 3, and also has a single argument of type A1, "arthropod," dominating the phrase "an arthropod's." Potentially each of these semantic predicates represents a relation, e.g. has-part, and the syntactic information in the parse also suggests relations, e.g. ABDOMEN is-a.

For all potential relations, a maximal start node and a maximal end node must be extracted. For start nodes, the desired maximal node is either a dependent phrase dominated by an argument (if that phrase is a key term, e.g. "abiotic factor") or, if no phrase is a key term, a single key term dominated by the argument itself, e.g. "factor." If neither phrase nor single key term exists in the dependent phrase dominated by the argument, then the relation falls outside of the pedagogical relations of interest and is ignored.

Maximal end nodes work much the same way, except that the dependent phrase or bare argument are no longer required to be key terms. If there is no key term present, the entire phrase is assigned to the end node because this tends to lead to more coherent relations. A simple stop list is used to filter out relations with singleton end nodes containing highly common words. Additionally, the predicate itself can be incorporated into the maximal end node when such incorporation has informative value, as is often the case with verbal predicates. For example, in the sentence, "The cell will manufacture these materials typically in the endoplasmic reticulum and then pass these chemicals into the Golgi Complex," a has-consequence relation exists between cell and materials through the predicate manufacture. Rather than extract the relation cell has-consequence materials, the relation cell has-consequence manufacture materials is extracted.

Several relations are handled purely syntactically. Is-a relations are indicated when the root verb of the sentence is "be," and the root "be" is not a helping verb. Adjectives create has propertyrelations between the start node they modify and the adjective/adjectival phrase itself. For example, "sensory nerves" becomes NERVES has-property sensory. Likewise prepositions can create a variety of relations. For example, if the preposition has part of speech "IN" and has a "LOC" dependency relation to its head (a locative relation), then the appropriate relation is location. For example, "by migrating whales in the Pacific Ocean" becomes "WHALES location migrating in the Pacific Ocean."

In the parser example given above, relations from Propbank and Nombank require a slightly more sophisticated approach. The system distinguishes between two scenarios: when an is-a relation is licensed and when it is not. If an is-a relation is licensed, it can affect how the system processes other predicates in the sentence. In the example shown in FIG. 4, it is desirable to require every relation to use ABDOMEN as the start node. Without this requirement, the relations extracted will tend to apply to other key terms besides abdomen, as shown in FIG. 1. The requirement to use the start node of the is-a relation for predicates that have no A0, as in FIG. 4, is fairly clear, but this requirement is extended to occasions where an A0 already exists. For example, in the sentence "abscission layer is a layer of cells at the petiole that seals off a leaf from the vascular system," "petiole" is the A0 of "seals." However, since an is-a relation exists, the system extracts the relation "ABSCISSION LAYER has-consequence seals a leaf from the vascular system."

On the other hand, when an is-a relation does not exist, we utilize multiple methods to construct a mapping between the Propbank or Nombank predicate and a corresponding start node, relation, and end node. The first method is manual annotation, by which frequent predicates are individually assigned a start node and end node. The second method is a machine learning approach that utilizes the additional information associated with predicates in Nombank and Propbank, such as role glosses and argument glosses, to create the mapping. The third method is a default set of rules that apply when the mappings above fail, for example when an instance of the predicate is missing a role or when a novel predicate is encountered. For missing roles, when A1 exists it is set to the start node, the relation is switched to has-property, and the end node is the string dominated by the predicate. For missing predicates, when A0 exists it is set to the start node, the relation is switched to has-consequence, and the end node is the string dominated by the predicate.

Adjunct arguments to a predicate, such as AM-LOC, may be further processed as separate relations or modifications to the current relation. AM-LOC specifies a location, and so a location relation can be extracted between the A0 of the predicate and the phrase dominated by the AM-LOC argument. Likewise a AM-NEG relation can modify a predicate's relation to negate it, e.g. arthropod not has-part abdomen. Similar cases exist for other adjuncts returned by a semantic role labeling parser, such as AM-DIR (direction) and AM-TMP (time).

Moreover, classifying the relations indicated by Propbank and Nombank predicates requires more consideration than classifying simple syntactic relations. The system examines several features in order to determine the relationship between the arguments, including the lexical form of the predicate and argument, whether the predicate type is from Propbank or Nombank, as well as specific features extracted from the Propbank/Nombank entry. These include a gloss for the roleset of the predicate, the label given to the argument, and the gloss given to the argument, e.g. for zoom: "move quickly," Arg1, entity moved. These features are input to a decision tree, which inspects the features by priority and assigns a relation. For example, if the roleset gloss contains "part," then the relation returned is has-part, and if the gloss given to the argument contains "attribute," then the relation returned is has-attribute.

Figure 5:
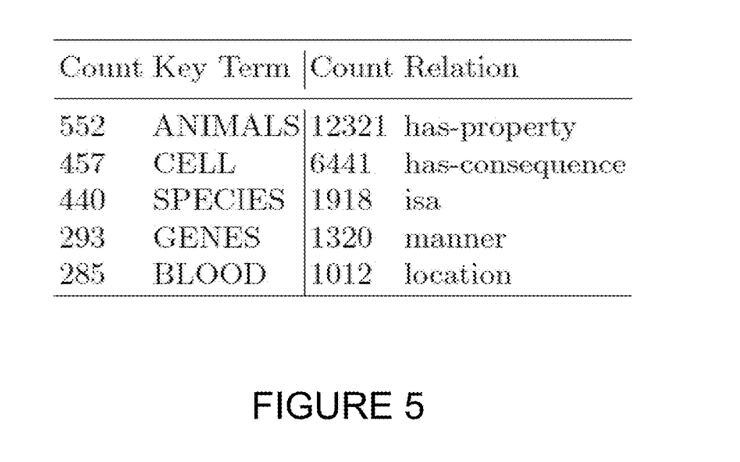
FIG. 5 shows a frequency table for key terms and relations for an exemplary extraction.

As an example, using this approach, the system extracted 28,994 relations from a thousand-page textbook. These relations were distributed around 1,886 key terms, a fraction of the possible key terms (see FIG. 2). The mean number of relations per term is 15.4, but the variation is quite high (minimum 1, maximum 552, standard deviation 31.7). The five most connected key terms are shown in FIG. 5. Of the 30 relations defined in FIG. 3, the system extracted 27 relations, excluding lack, requires, and same-as. The top five relations are also listed in FIG. 5; these relations make up roughly 80% of the total relations. It also should be noted that has-property, is-a, and has-part relations make up 52% of the total relations, which is consistent with reported human conceptual graphs for biology domains.

Figure 6:
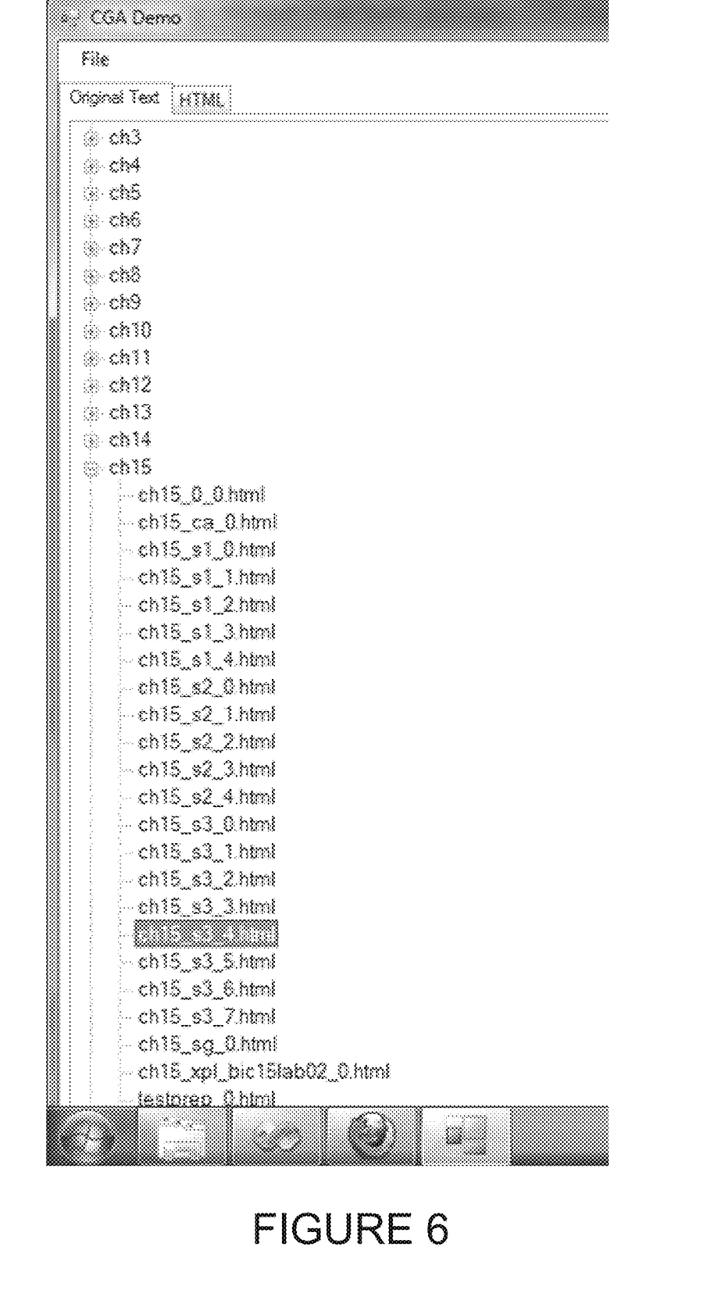
FIGS. 6-9 show examples of a user interface for a system in accordance with an exemplary embodiment of the present invention.
Figure 7:
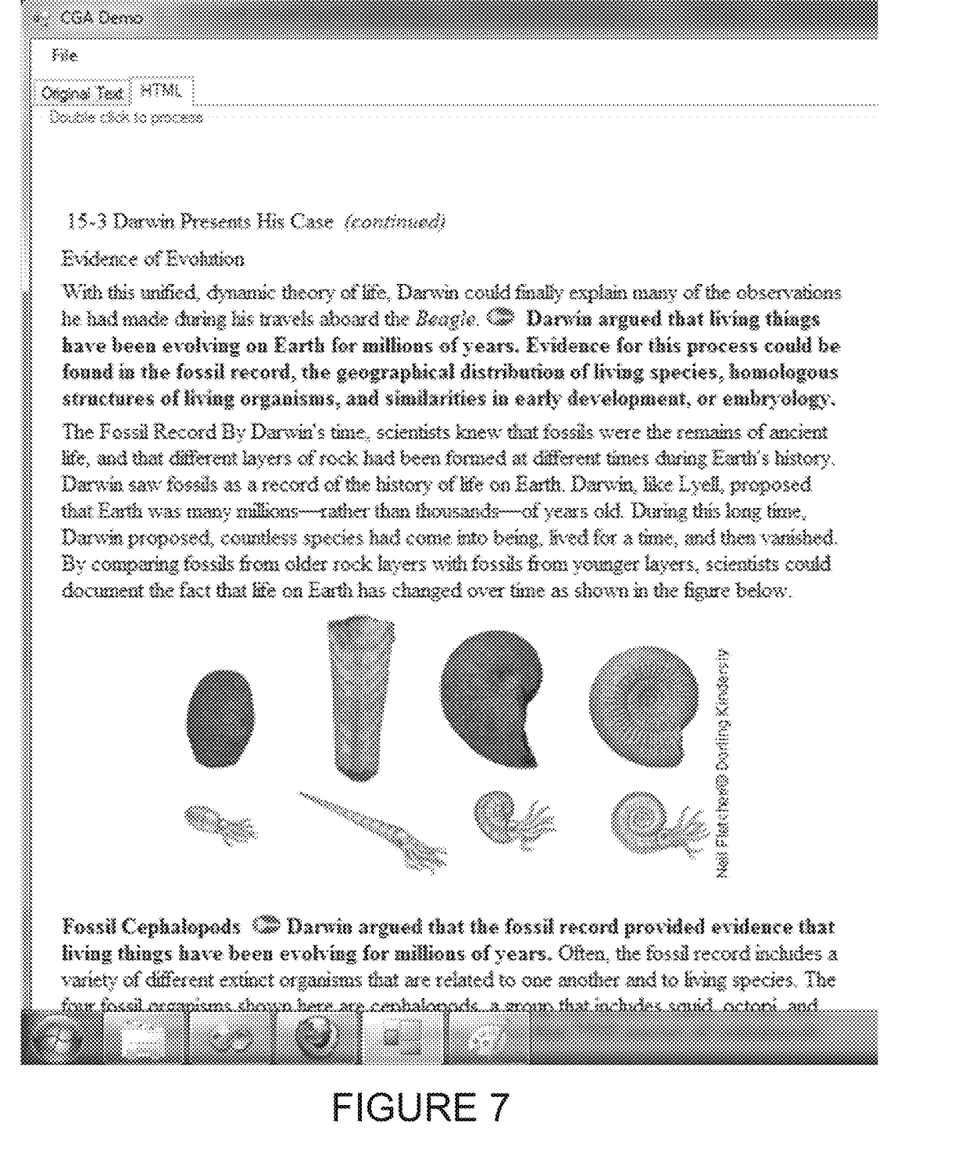
Figure 8:
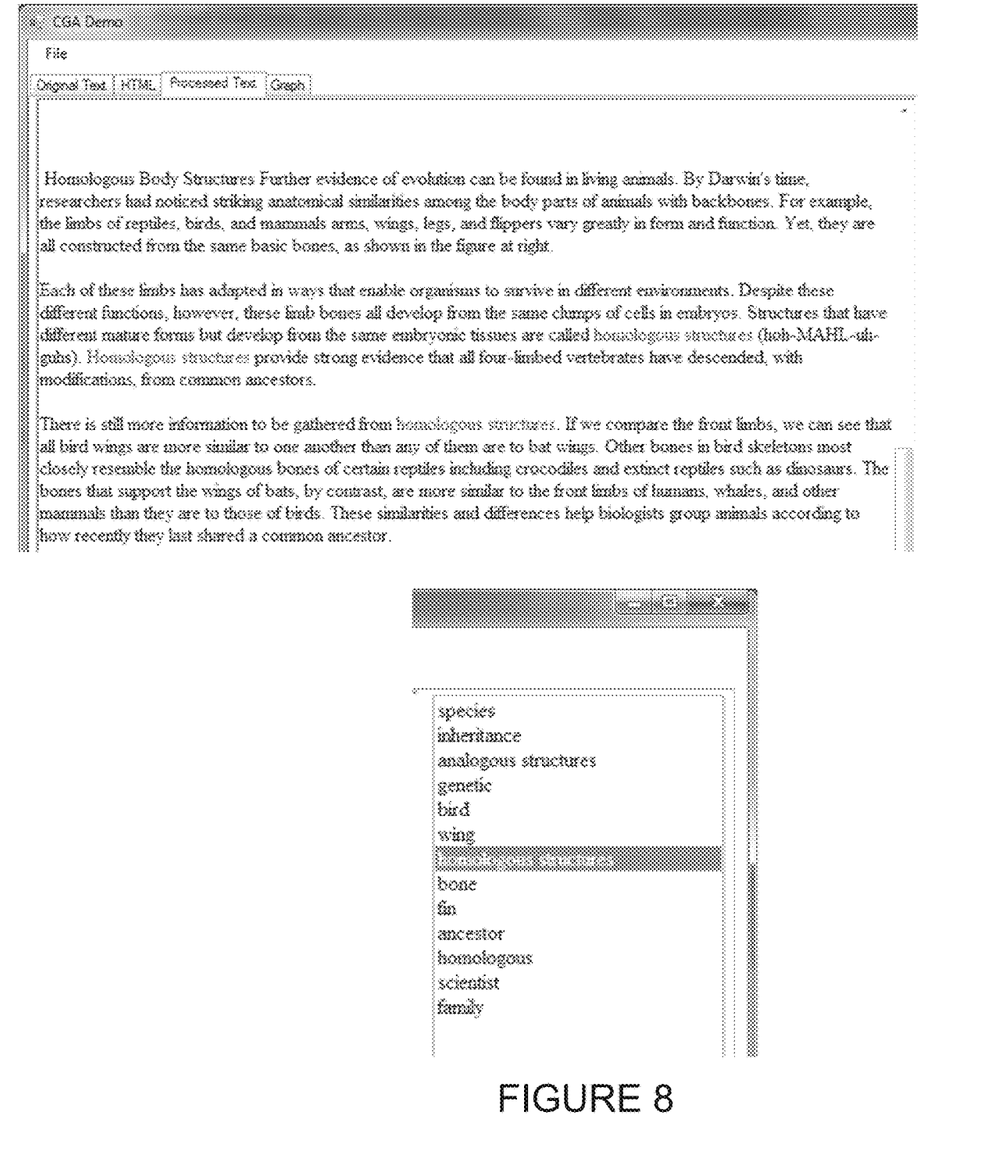
Figure 9:
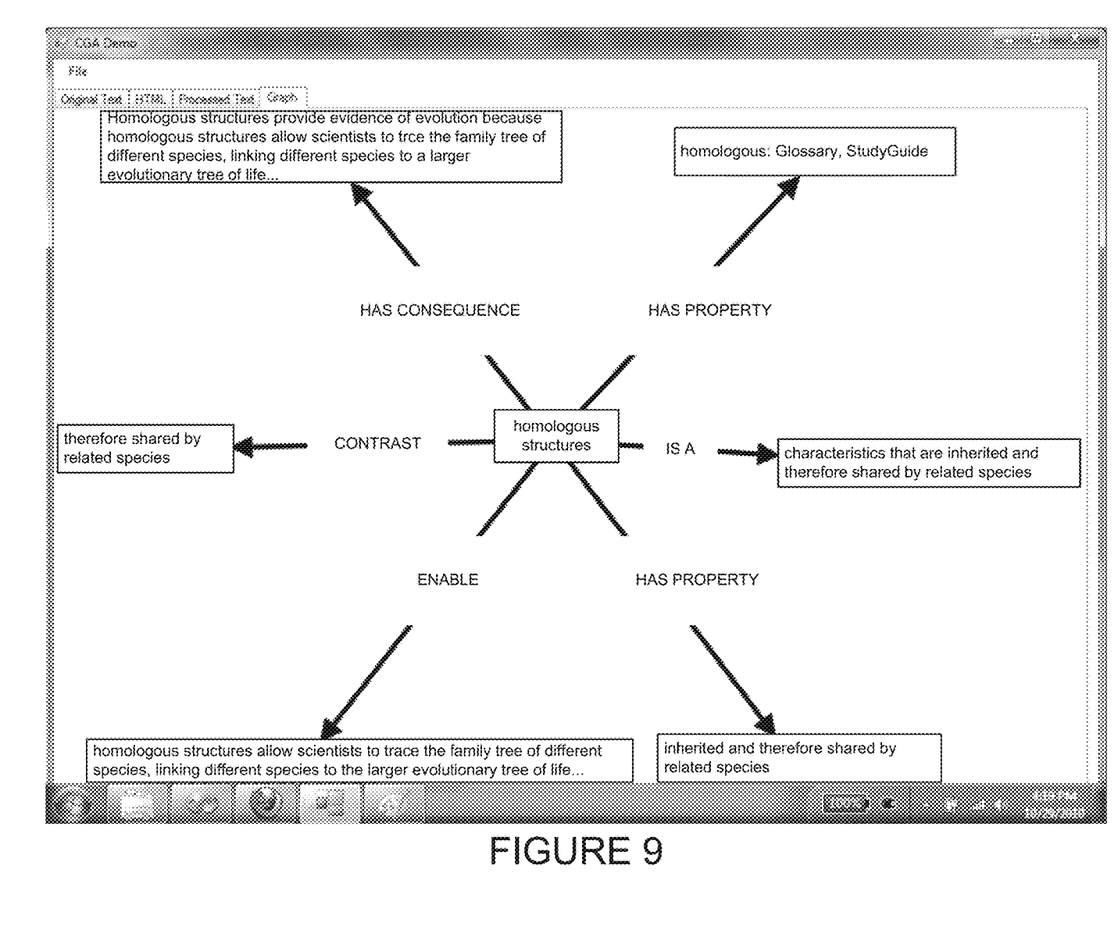

FIGS. 6 through 9 show examples of a user interface for an embodiment of the system. FIG. 6 shows the process of selecting a section (e.g., a file) from a text to process. FIG. 7 shows the section being processed. FIG. 8 shows the selection of a particular graph from the section, and FIG. 9 is a display of that graph.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method of automatically extracting conceptual graphs from text files, comprising the steps of:
   first determining a set of pedagogically significant key terms, wherein the key terms do not comprise all of the terms in the text file or files, and the key terms are derived from text that does not include the text from which the conceptual graphs are generated;
   after the step of determining a set of pedagogically significant key terms, determining a set of semantic relationships between the key terms;
   after the step of determining a set of pedagogically significant key terms, defining a prescribed set of edge relations;
   after the step of determining the set of semantic relations and the step of defining the prescribed set of edge relations, semantically parsing, using a computer microprocessor coupled to a computer memory, one or more text files; and
   after the step of semantically parsing, automatically extracting, using the computer microprocessor, one or more conceptual graphs from the text file or files based upon the set of semantic relationships between the key terms and the prescribed set of edge relations; and
   creating questions in an automated tutor system based upon said one or more conceptual graphs.

2. The method of claim 1, wherein the determination of the set of pedagogically significant key terms and the set of semantic relationships is performed for a particular subject matter area or domain.

3. The method of claim 2, wherein the set of pedagogically significant key terms is derived from glossaries, study guides, or indices in text materials in the subject matter area or domain.

4. The method of claim 2, wherein the determining of the set of semantic relationships is based on specific relations between key terms for the subject matter area or domain, and on psychologically-motivated general relations.

5. The method of claim 1, wherein the conceptual graphs are incorporated into an intelligent tutoring system operating on a computing device with a computer microprocessor and computer storage media.

6. The method of claim 1, wherein the step of parsing is carried out by a parsing program operating in computer memory on a computing device.

7. The method of claim 1, wherein the step of parsing outputs a dependency parse annotated with semantic roles for the parsed terms.

8. The method of claim 1 wherein the step of extracting the one or more conceptual graphs comprises deriving relations between terms in the parse output and identifying parsed terms connected by a relation.

9. The method of claim 8, further wherein a maximal start node and a maximal end node are extracted.

10. The method of claim 9, wherein the maximal start node is a dependent phrase dominated by an argument, or a single key term dominated by the argument itself.

11. The method of claim 1, wherein the key terms are derived from text that does not include the text from which the conceptual graphs are extracted.

12. A machine for automatically extracting a conceptual graph, comprising:
   a microprocessor or processor coupled to a memory,
   wherein the microprocessor or processor is programmed to extract a conceptual graph from a text by:
   first determining a set of pedagogically significant key terms, wherein the key terms are derived from text that does not include the text from which the conceptual graphs are generated;
   subsequently obtaining a set of pre-determined semantic relations between the pedagogically significant key terms based on a particular subject matter area or domain, and according to a prescribed set of edge relations;
   subsequently obtaining parse output by semantically parsing one or more text files in computer-readable form related to the subject matter area or domain; and
   after semantically parsing the one or more text files, deriving semantic relations between terms in the parse output according to the set of pre-determined semantic relations between the pedagogically significant key terms based on the subject matter area or domain, and according to the prescribed set of edge relations;
   further wherein the microprocessor processor is programmed to create one or more questions in an automated tutor system from said conceptual graph.

13. The machine of claim 12, further wherein a maximal start node and a maximal end node are extracted from the text file or files.

14. The machine of claim 13, wherein the maximal start node is a dependent phrase dominated by an argument, or a single key term dominated by the argument itself.

15. The machine of claim 12, wherein the key terms are derived from glossaries, study guides, or indices in text materials in the subject matter area or domain.

16. The machine of claim 12, wherein the set of pre-determined semantic relations is based on specific relations between key terms for the subject matter area or domain, and on psychologically-motivated general relations.

17. The machine of claim 12, wherein the extracted conceptual graph or graphs are incorporated into an intelligent tutoring system operating on a computing device with a computer microprocessor and computer storage media.

18. The machine of claim 12, wherein the key terms are derived from text that does not include the text from which the conceptual graphs are extracted.

19. A system for automatically extracting conceptual graphs from text files, comprising:

first determining a set of pedagogically significant key terms, wherein the key terms are derived from text that does not include the text from which the conceptual graphs are generated;

after the determining the set of pedagogically significant key terms, determining a set of semantic relationships between the key terms;

after the determining the set of pedagogically significant key terms, defining a prescribed set of edge relations;

after the determining the set of semantic relations and the defining the prescribed set of edge relations, semantically parsing, using a computer microprocessor coupled to a computer memory, one or more text files; and after the semantically parsing, automatically extracting, using the computer microprocessor, one or more conceptual graphs from the text file or files based upon the set of semantic relationships between the key terms and the prescribed set of edge relations; and creating questions in an automated tutor system based upon said one or more conceptual graphs.

\* \* \* \* \*